United States Patent
Gorin

[15] 3,679,811
[45] July 25, 1972

[54] RIGID MULTICONDUCTOR BUS SYSTEM FOR USE IN HIGH CURRENT AND EXTRA ULTRA HIGH VOLTAGE SYSTEMS

[72] Inventor: Eugene Gorin, Greensburg, Pa.
[73] Assignee: I-T-E Imperial Corporation, Philadelphia, Pa.
[22] Filed: Sept. 18, 1970
[21] Appl. No.: 73,491

[52] U.S. Cl. .................... 174/72 B, 174/99 E, 174/133 B, 174/140 CR, 174/149 B
[51] Int. Cl. .................................................. H02g 5/00
[58] Field of Search ............. 174/13, 16 B, 68 B, 70 B, 71 B, 174/72 B, 88 B, 99 R, 99 B, 99 E, 100, 119 R, 127, 129 B, 133 R, 133 B, 149 B, 140 CR, 144, 171; 307/147; 191/22 R, 33 R

[56] References Cited

UNITED STATES PATENTS

| | | | |
|---|---|---|---|
| 3,585,270 | 6/1971 | Trump | 174/13 |
| 1,101,579 | 6/1914 | Steinberger | 174/133 R X |
| 1,157,393 | 10/1915 | Hoopes et al. | 191/33 R |
| 2,033,743 | 3/1936 | Shoemaker | 174/129 B X |
| 3,286,018 | 11/1966 | McLoughlin | 174/133 R X |

FOREIGN PATENTS OR APPLICATIONS

| | | | |
|---|---|---|---|
| 475,103 | 7/1951 | Canada | 191/33 R |
| 32,927 | 6/1912 | Sweden | 191/22 R |
| 177,045 | 7/1935 | Switzerland | 174/144 |

*Primary Examiner*—Laramie E. Askin
*Attorney*—Ostrolenk, Faber, Gerb & Soffen

[57] ABSTRACT

A rigid multiconductor bus system for conducting high currents in multi-phase EHV and UHV transmission system applications. The conductor system for each phase is comprised of a multiplicity of annular or semi-annular-shaped conductors having an integrally mounted flange. The conductors are arranged about spaced intervals along an imaginary cylinder. The integrally mounted flanges are radially aligned, and are mechanically joined at spaced intervals along the bus to "star type" extrusions to provide a rigid multiconductor structure. The integrally mounted flanges may further be employed to mechanically and electrically join the conductors to tap members to couple cable or flat bus thereto.

10 Claims, 27 Drawing Figures

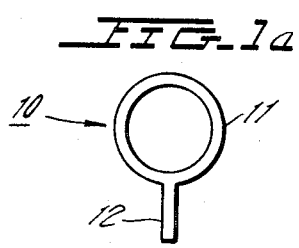
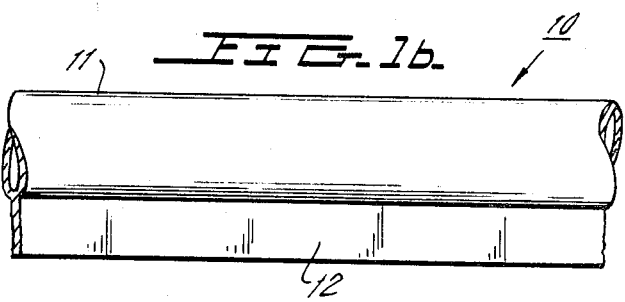
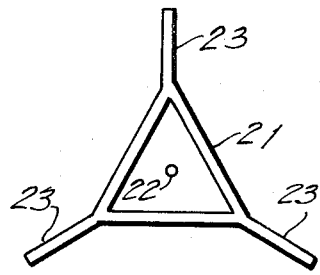
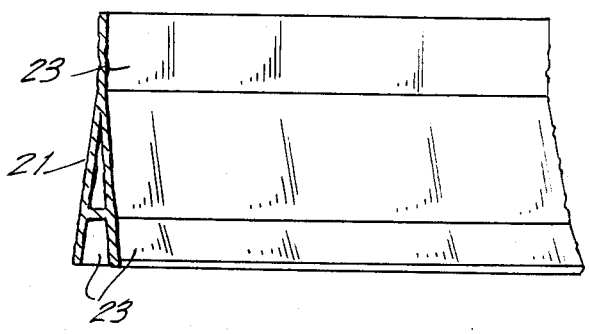
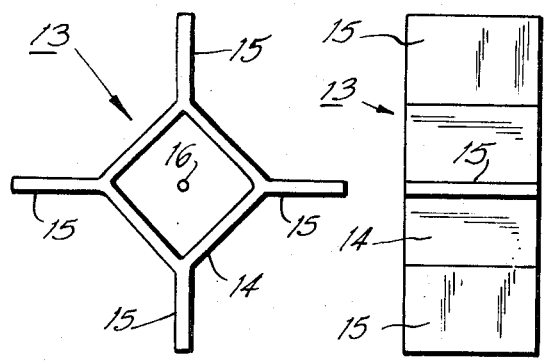
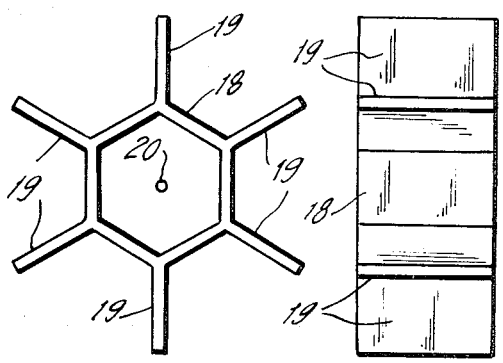
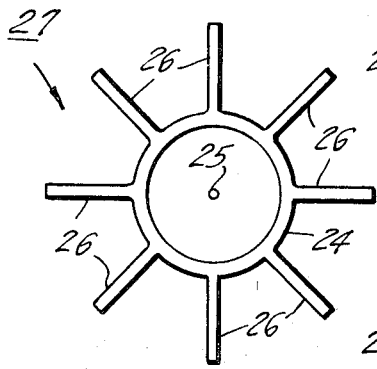
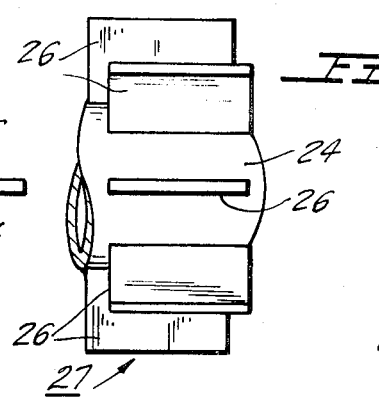
INVENTOR.
EUGENE GORIN
BY Ostrolenk, Faber, Gerb & Soffer
ATTORNEYS

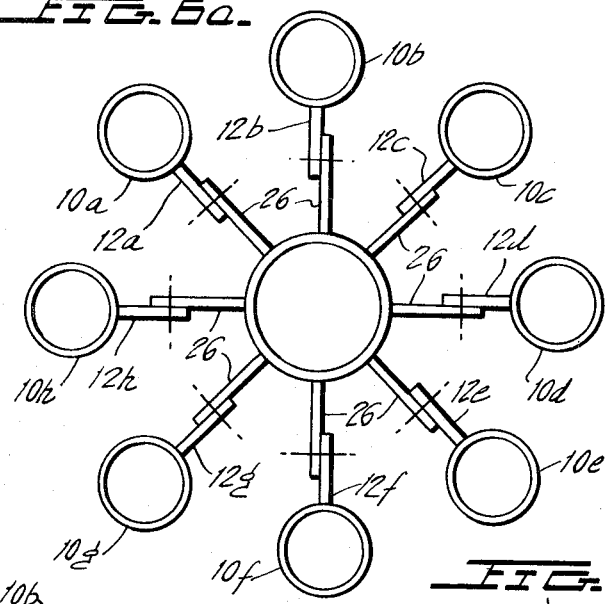
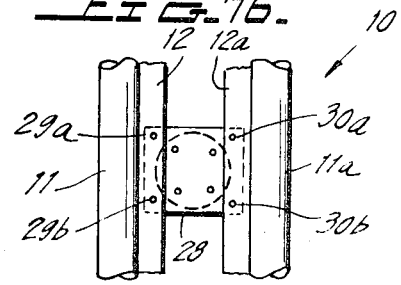
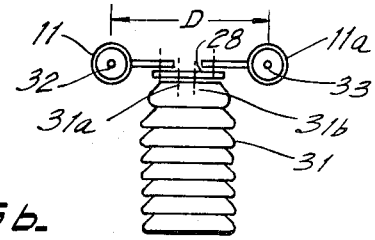
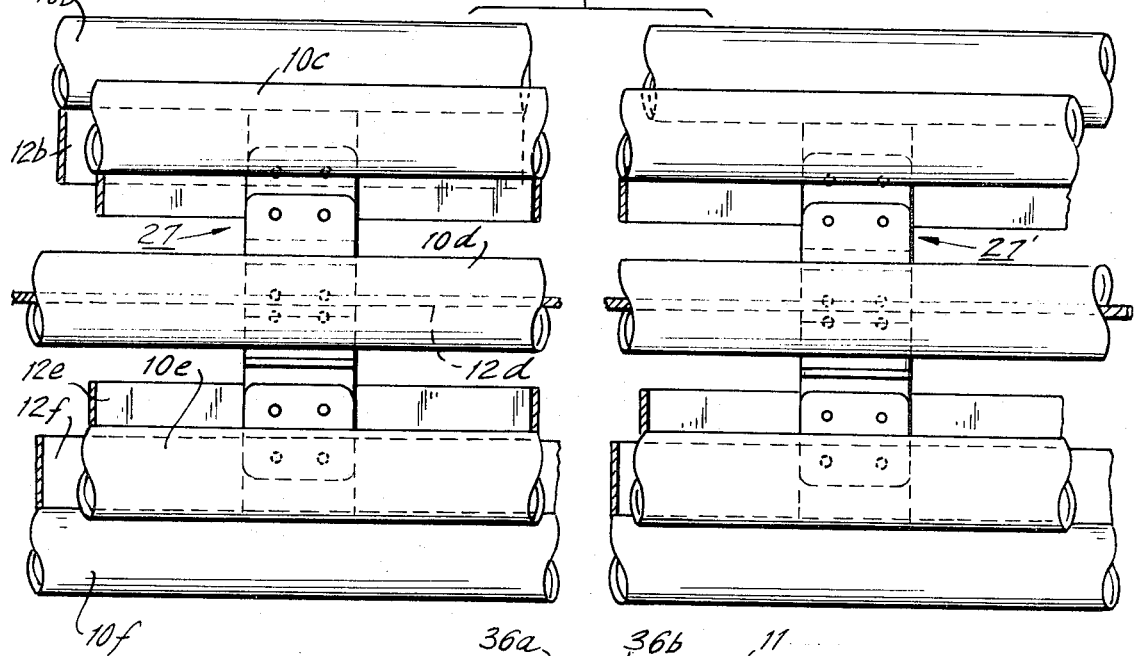
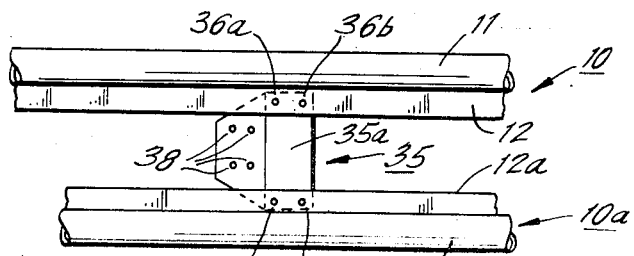
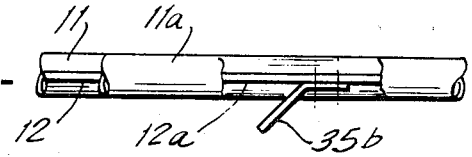

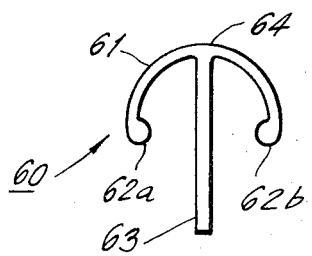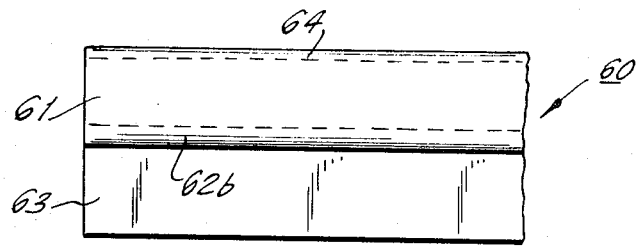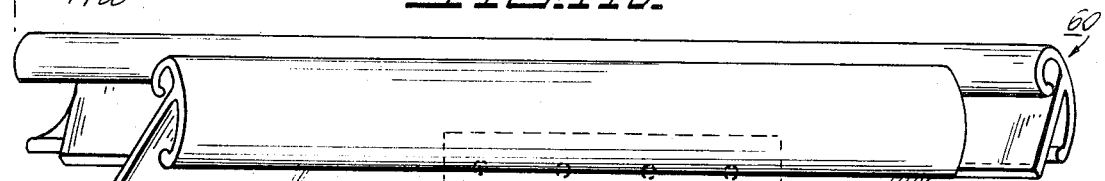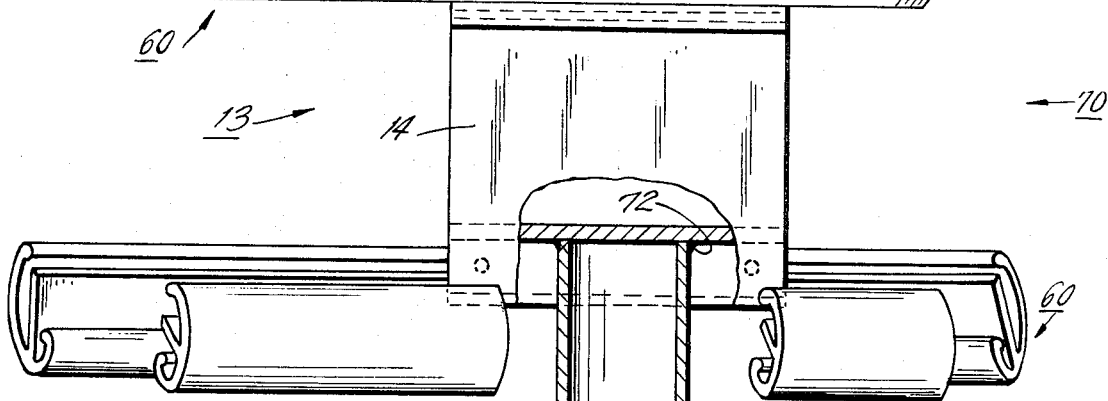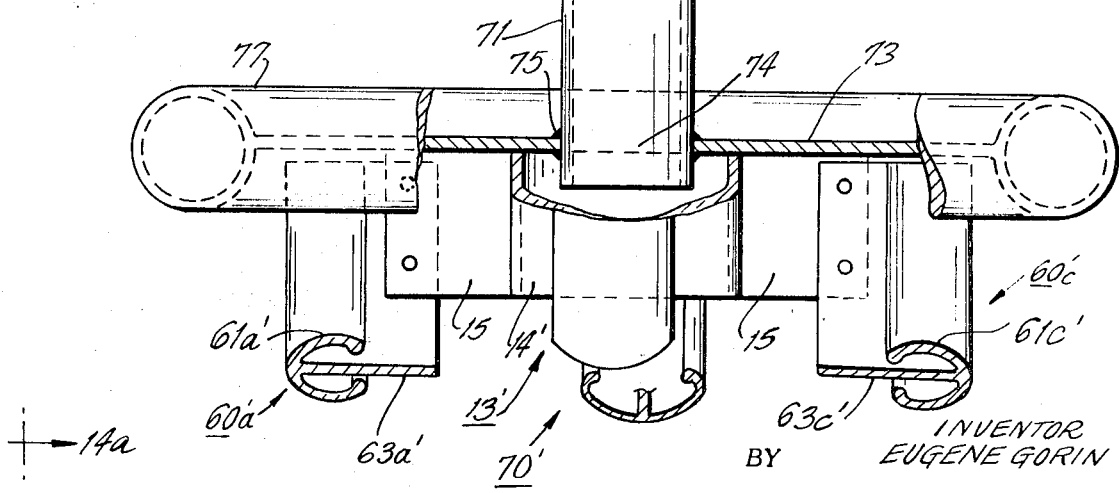

INVENTOR.
EUGENE GORIN

Ostrolenk, Faber, Gerb & Soffen
ATTORNEYS

RIGID MULTICONDUCTOR BUS SYSTEM FOR USE IN HIGH CURRENT AND EXTRA ULTRA HIGH VOLTAGE SYSTEMS The present invention relates to rigid multiconductor bus, and more particularly to multiconductor bus having low radio influence voltage (RIV), high current carrying capacity, high rigidity, and relatively low weight for given capacity.

All this is accomplished by a proper combination of numbers of basic extrusion conductors as illustrated hereinbelow, arranged in space with their longitudinal axes lying on a cylindrical surface With its radial projection directed toward the center of this imaginary cylinder and fastened together at regular intervals by short lengths of a second extrusion to form a solid assembly, with the number of subconductors employed being dependent upon the particular application.

BACKGROUND OF THE INVention

Power distribution and transmission systems, especially as employed over long distances, must be designed to provide good operating efficiency and thereby to limit power losses. The trend in the power distribution and transmission field is to transmit electrical energy at extremely high voltages. Heretofore, electrical energy was transmitted at voltages of the order of 345 kilovolts (345 kV). Recently transmission voltage was increased to 500 and 765 kV with projections to extend it to 1,100 kV. At the present time EHV range is normally considered to extend between 345 and 765 kV, voltages above 765 are referred to as UHV. The selection of EHV and UHV bus conductors for energy transmission and distribution is largely controlled by the radio influence voltage (RIV) which is associated with the appearance of visible corona developed on the conductor surface. Corona is a luminous electrical discharge caused by electrical overstress due to the ionization of the air surrounding the current carrying conductor as the result of a voltage gradient surrounding the conductor exceeding a certain critical value. The voltage level at which corona disturbances appear on the conductor is proportional to the outside radius of curvature of the energized conductor.

Therefore, in order to maintain a relatively low value of radio influence voltage (typically referred to as RIV) in applications employing high operating voltages, the outside diameter of the current carrying conductor must be increased more rapidly than would normally be required to provide for sufficient current carrying capacity or mechanical requirements. The necessary increase in diameter of the bus conductor results in a heavy additional financial burden upon such systems, which costs rapidly increase as operating voltages approach the 1,100 kV level.

Recent investigation of corona phenomenon has resulted in the development of a new technique for overcoming the development of corona. It has been discovered that one large conductor may be replaced or substituted by a group of spaced parallel conductors. The arrangement of conductors is selected to create the proper electrostatic field which lies below the corona inception level which may be accomplished through the selection of the proper combination of subconductor diameters and spacings. Such arrangements are capable of providing sizable economic savings. Many recent EHV and UHV transmission lines have been built which utilize the above principle, and experimentation and use of such systems has shown that the results fully confirm the advantages of the multiconductor technique. One typical system employing this technique is set forth in U.S. Pat. No. 3,510,569 issued May 5, 1970, and assigned to the assignee of the present invention. The basic technique employed in such arrangements consists of the use of substantially rigid spacing means provided at spaced intervals along the multiconductor bus run, whereby spacing between intervals is normally maintained by the rigidity of the component conductors.

THE BASIC CONCEPT OF THE INVENTION

The major purpose of the present invention is to accomplish the same protection and objectives as are obtained, for example, in the above mentioned U.S. Pat. No. 3,510,569 through more simplified and hence more economical structures. The present invention is characterized by providing a bus run of high current carrying capability with low RIV, high rigidity, especially adapted for use in EHV and UHV applications wherein the bus run is comprised of extruded sections, each section having a shell-shaped current carrying portion and an integrally joined flange portion for mounting and support purposes, which extruded sections may be arranged in a variety of fashions.

In one preferred embodiment, each of the current carrying conductors which form a single bus run is an extruded conductive member having a hollow tubular section integrally joined to an outwardly projecting mounting and supporting rib which is aligned substantially along one radius of the tubular portion. A group of extruded sections are arranged substantially in an annular pattern with their integrally joined ribs being directed inwardly toward an imaginary central axis. The conductors are joined at spaced intervals along the bus run by star-shaped extrusions whose central axes are substantially coincident with the aforementioned imaginary central axis and which are provided with outwardly directed radially aligned ribs for mechanically fastening and joining the ribs of the previously mentioned conductors. The particular cross-sectional configuration of the star extrusions employed are dictated by the number of conductive members required for a bus run which, in turn, are dictated by the current carrying requirements and the operating voltage level of the bus run.

In another preferred embodiment, the current carrying portions of the conductor sections may be semi-circular-shaped extrusions arranged in a similar fashion to that described hereinabove, which alternative embodiment may be employed in applications which require four or more subconductors per bus run.

Cylindrical arrangement of subconductors provides an extremely high corona level (low RIV), great rigidity (high moment of inertia), and large radiating surface with excellent heat dissipation per unit length, thereby greatly increasing the current carrying capacity. Low weight per unit length and given current capacity of the bus run and extremely high rigidity and high moment of inertia allows use of larger spacing between supporting insulators resulting in sizable economy of conductors and expensive insulators. The electromagnetic forces which are developed by the multiplicity of conductors within the bus run are predominantly aligned in the radial direction of the maximum moment of inertia which further contributes to high efficiency and excellent utilization of conductive material.

It is, therefore, one object of the present invention to provide a novel current carrying structure for high current capacity and high operating voltage systems wherein the techniques for maintaining adequate spacing between the multiplicity of conductors is highly simplified.

Another object of the present invention is to provide a novel bus assembly for use in power transmission and distribution systems of very high current and voltage ratings, which assembly is comprised of a plurality of individual conductors of cylindrical or semi-cylindrical shape, each provided with an integrally formed projecting rib wherein spacing of the conductors are maintained by star extrusions provided at spaced intervals along the bus run, which star extrusions are readily and simply joined to the aforementioned projecting ribs.

These as well as other objects of the present invention will become apparent when reading the accompanying description and drawings in which:

FIGS. 1a and 1b are end and side views, respectively, showing a conductor designed in accordance with the principles of the present invention.

FIGS. 2a and 2b are side and end views, respectively, of one star-type extrusion which may be employed with the conductor of FIGS. 1a and 1b.

FIGS. 3a through 5a and 3b through 5b are end views and side views, respectively, of other preferred embodiments of star extrusions which may be employed as alternatives to the star extrusion of FIGS. 2a and 2b.

FIGS. 6a and 6b are end and side views, respectively, of a multiconductor bus assembly showing the manner in which the individual conductors are joined to a star-type extrusion.

FIG. 7a is an elevational view showing the manner in which one multiconductor assembly may be directly supported by a standard insulator eliminating the need for a bus support fitting with sizable saving.

FIG. 7b shows a top plan view of the embodiment of FIG. 7a.

FIG. 8a shows a top plan view of a multiconductor assembly of the type shown in FIG. 7b incorporating a tap member. This also results in a saving of "tee connectors."

FIG. 8b shows an elevational view of the embodiment of FIG. 8a.

Figure 9:
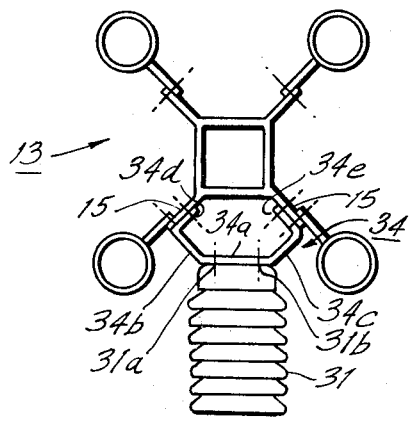

FIG. 9 shows an elevational view of a multiconductor assembly designed in accordance with the principles of the present invention and further showing the means in which the assembly may be supported by an insulating bushing.

Figure 10:
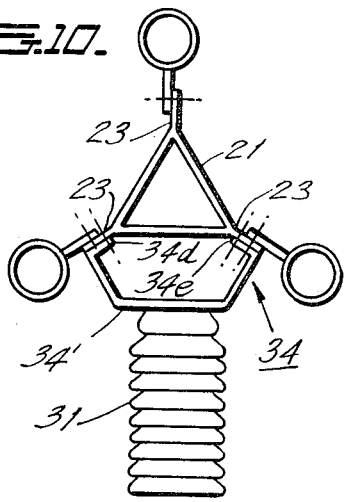

FIG. 10 is an elevational view showing another alternative embodiment relative to that shown in FIG. 9.

Figure 11A:
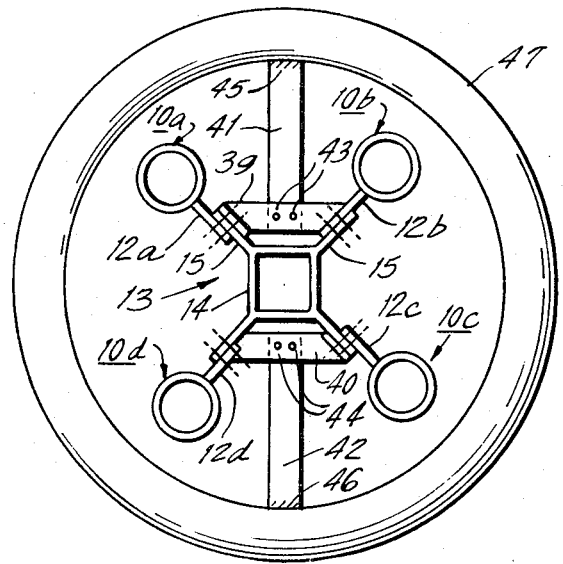

FIG. 11a shows an end view of a multiconductor assembly designed in accordance with the principles of the present invention and further showing the manner in which a corona ring may be mounted to the assembly.

Figure 11B:
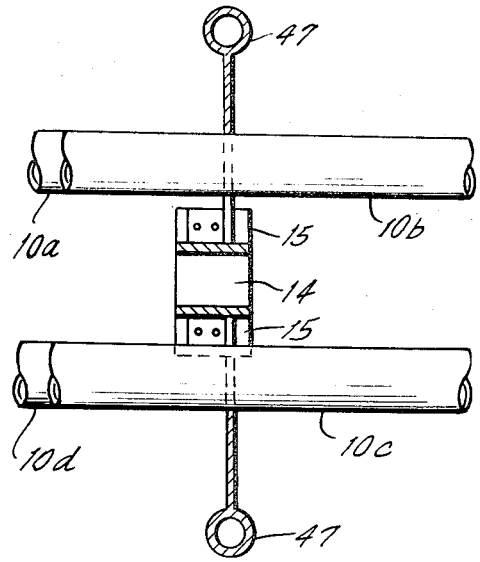

FIG. 11b shows a side elevational view of the embodiment of FIG. 11a.

Figure 12A:
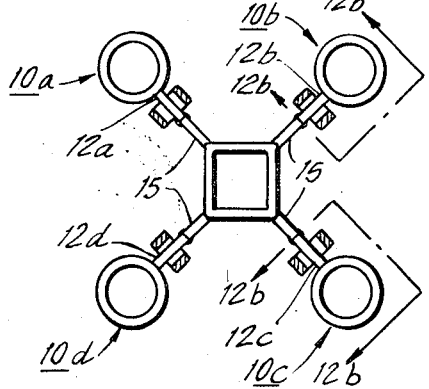
Figure 12B:
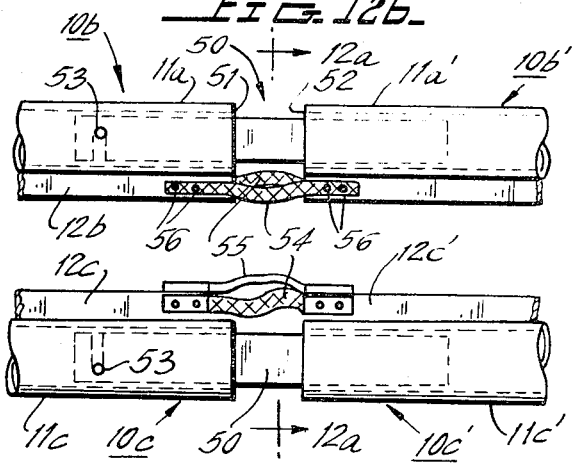

FIG. 12a shows an end view of the multiconductor assembly designed in accordance with the principles of the present invention showing the manner in which expansion connectors are mounted thereto and, with the said end view looking in the direction of arrows 12a–12a of FIG. 12b.

FIG. 12b is a side view of portions of the bus assembly of FIG. 12a looking in the direction of arrows 12b–12b.

FIG. 13a shows an end view of an alternative conductor structure (relative to FIG. 1a) embodying the principles of the present invention.

FIG. 13b shows a side view of the conductor assembly of FIG. 13a.

Figure 14C:
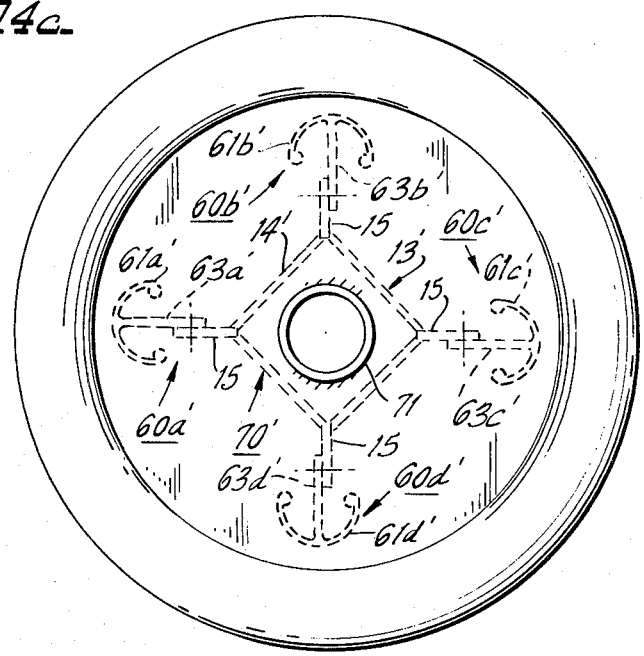
Figure 14A:
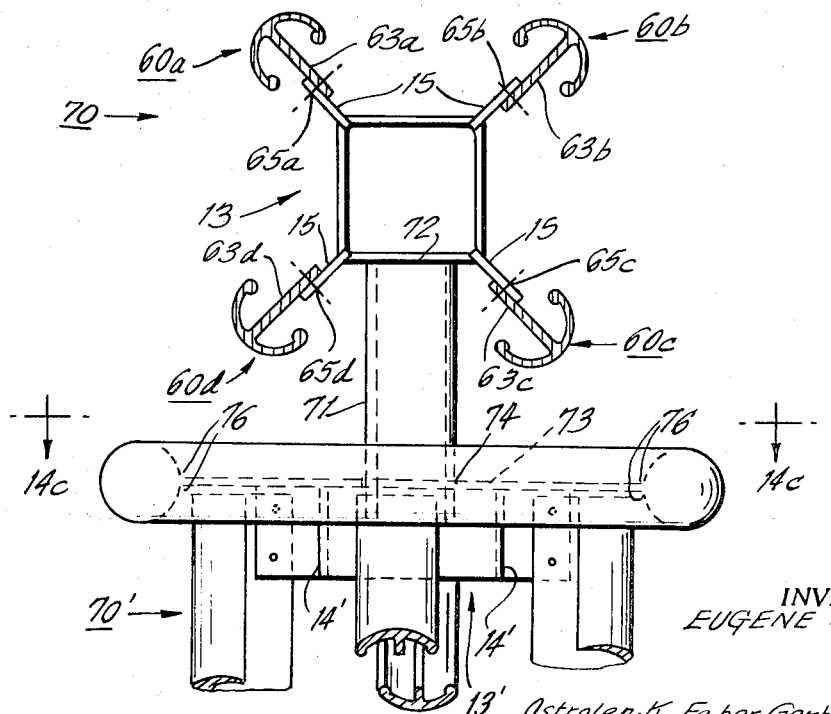

FIG. 14a shows an end view of first and second multiconductor bus assemblies employing conductors of the type shown in FIGS. 13a and 13b, being arranged at right angles to one another and showing the manner in which they are electrically joined to form a bus tap therebetween.

FIG. 14a is an end view of the assembly of FIG. 14b looking in the direction of arrows 14a–14a.

FIG. 14b is a perspective, partially sectionalized view of the bus tap assembly of FIGS. 14a and 14c.

FIG. 14c shows a view of a portion of the bus tap assembly of FIG. 14a looking in the direction of arrows 14c–14c.

Referring now to the drawings, FIGS. 1a and 1b show the basic extrusion 10 which embodies the principles of the present invention and which is comprised of a hollow, elongated cylindrical conductor 11 having an integrally formed longitudinal rib 12 extending outwardly from the conductor 11 along one diameter of the conductor. The extrusion may be formed of any suitable metal having good conductive properties such as, for example, aluminum, copper and special alloys that may be developed for use as element conductors. The number of extrusions 10 employed at any bus assembly is dependent upon the current and voltage requirements of the system. The total number of extrusions 10 which are required, in turn, dictates the type of joining extrusion which is required. FIGS. 2a through 6b show a variety of different joining extrusions which may be employed, depending upon the number of conductors required in any given application. FIGS. 3a and 3b show an extrusion 13 which may be employed for a four-conductor system. The extrusion is comprised of a hollow, square-shaped conductive core 14 having a plurality of outwardly directed radially aligned ribs 15 substantially arranged along radial lines which extend outwardly from the central axis 16 of the supporting extrusion. The conductive members are joined to the supporting extrusion, in a manner to be more fully described, by suitable fastening means. The extrusions are arranged at spaced intervals along the bus run and are typically of the order of a few inches in length sufficient for proper connection spaced apart by distances usually in the range from 3 to 20 feet, depending on sizes of individual conductors and mechanical requirements to provide the desired rigid assembly.

FIGS. 4a and 4b show still another form of a star-type extrusion having a hexagonal-shaped hollow core portion 18 concentrically arranged about central axis 20 and being provided with a plurality of radially aligned projecting ribs 19. As is obvious from FIGS. 4a and 4b, this star-type extrusion may be employed for mounting six conductors of the type shown in FIG. 1a.

FIGS. 2a and 2b show still another star-type extrusion having a triangular-shaped hollow core portion 21 substantially concentrically arranged about a central axis 22 and being provided with radially aligned outwardly projecting ribs 23.

FIGS. 5a and 5b show still another star-type extrusion having a cylindrical-shaped hollow core portion 24 concentrically arranged about a longitudinal axis 25 and being provided with a number of radially aligned outwardly projecting ribs 26 sufficient to mount a total of eight conductors of the type shown in FIGS. 1a and 1b. The star-type extrusion 27 of FIGS. 5a and 5b is also shown in FIGS. 6a and 6b which further shows the manner in which eight conductors 10a through 10h are mounted thereto. FIG. 6b shows a side view of the embodiment of FIG. 6a which incorporates two such star-type extrusions 27 and 27'. As can best be seen in FIG. 6a, the projecting ribs 12a through 12h of conductive members 10a through 10h, respectively, form a lap joint with an associated one of the projecting ribs 26 integrally formed with the core member 24. Any suitable fastening means may be employed such as threadedly engaged nuts and bolts (not shown for purposes of simplicity). The side view of the embodiment of FIG. 6a shown in FIG. 6b indicates that a pair of such fastening means may be utilized to join each of the ribs 12a through 12h to the ribs 26. Although FIG. 6b shows the conductors 10a through 10h in broken form, it should be understood that the conductors are substantially elongated sections joined at spaced intervals by substantially short sections of star extrusions 27 and 27'. As can clearly be seen from the fully assembled embodiment of FIGS. 6a and 6b, the single bus run (which may, for example, be a conductive assembly for one phase of a multiphase bus) is provided with a large number of conductors whose total surface area provides for excellent heat dissipation resulting in a large current carrying capacity for each phase of the bus run. Due to the radial arrangement, the structure has a high moment of inertia, thereby providing a high rigidity through a structure having relatively low weight per unit length as well as providing a structure which is simple and straightforward from the view point of installation, thereby making it rather inexpensive. The electromagnetic forces developed as a result of the conducting currents are predominantly aligned in the radial direction of maximum moment of inertia of each conductor extrusion 10a through 10h which further contributes to high efficiency and excellent utilization of material.

Two extrusions 10 of the type shown in FIGS. 1a and 1b can be used to considerable advantage for numerous other applications. For example, the mounting rib 12 can be bolted directly to an insulator cap and thereby eliminate the need for a bus support. The structure also lends itself as a natural means to tap conductors. FIGS. 7a and 7b show two such conductors 11 and 11a having their mounting ribs 12 and 12a arranged in horizontally aligned fashion and secured to a rigid spacer plate 28 by suitable fastening means (not shown) which may be arranged at locations 29a and 29b (on rib 12) and 30a and 30b (on rib 12a). The spacer plate 28, in turn, is mounted to the top of an insulator bushing 31 by suitable fastening means (not shown for purposes of simplicity) located at 31a and 31b. This structure forms a rigid two-conductor bus whose horizontal moment of inertia can be considerably increased merely by increasing the dimension D measured between the central axes 32 and 33 of conductor portions 11 and 11a, respectively, which value readily compensates for short-phase spacing and large conducting currents while at the same time providing a simple and inexpensive replacement for costly integral web-type bus. Metal strap members of relatively simple design can be employed to replace expensive bus supports, as shown in FIGS. 9 and 10.

FIG. 9 shows a bus support structure for a four-conductor bus assembly in which the insulator bushing 31 has secured thereto a strap member 34 having an intermediate portion 34a secured to the top of bushing 31 by suitable fastening means (not shown for purposes of simplicity) which may be provided at locations 31a and 31b. The free ends of strap member 34 project first outwardly (at 34b and 34c) and then inwardly (at 34d and 34e) to abut against and be mechanically fastened to the mounting ribs 15 of star-type extrusion 13 which is also shown in detail in FIGS. 3a and 3b.

FIG. 10 shows a similar but slightly modified arrangement to that shown in FIG. 9 wherein the mounting bracket 34' is of a similar configuration and has its inwardly bent portions 34d and 34e fastened to the mounting ribs 23 of the star-type extrusion of FIG. 2a which has a triangular-shaped hollow core 21 and is also shown in FIGS. 2a and 2b.

The conductor extrusions of the present invention may also be advantageously employed to cooperate with tap members of highly simplified design for making a tap connection between the multiconductor bus and bus of the cable or flat bus type. As shown in FIGS. 8a and 8b, the pair of conductor extrusions 10 and 10a are arranged in spaced parallel fashion with the rib portions 12 and 12a being substantially coplanar. A tap member 35 having a horizontally aligned portion 35a is secured by suitable fastening means (not shown) to rib 12 (at locations 36a and 36b) and to rib 12a (at locations 37a and 37b). The free end 35b of tap member 35 is tapered in the manner shown best in FIG. 8a and is bent downwardly so as to be diagonally aligned as shown best in FIG. 8b. Suitable openings 38 are provided for mounting a clamp to couple either flat or cable-type bus thereto.

Corona rings may be provided for projecting insulator caps or other peripheral equipment connected to the bus and may be very simply and easily supported upon the bus structure in the manner shown best in FIGS. 11a and 11b. The assembly of FIG. 11a is comprised of a star-type extrusion 13 (note also FIGS. 3a and 3b) whose mounting ribs 15 position and support the ribs 12a through 12d of conductor extrusions 10a through 10d, respectively. A pair of straps 39 and 40 having their outer ends bent to form taps for receiving fastening members are positioned as shown in FIG. 11a so as to receive and be supported by the same fastening members (not shown) which secure the ribs 12a through 12d to the ribs 15 of the star-type extrusion 13. A pair of vertically aligned straps 41 and 42 have their inner ends secured by suitable fastening means (not shown) located at 43 and 44, respectively, to straps 39 and 40, respectively, and have their outer ends coupled to the interior surface of a toroidal-shaped conductive ring 47, as indicated by weldments 45 and 46, respectively. The toroidal-shaped conductive ring 47 operates as a corona shield to prevent the development of corona and may be located in the region of a tap, an insulator bushing or other peripheral equipment either electrically connected to or closely physically positioned relative to the bus run.

FIGS. 12a and 12b show one manner in which sections of the conductive extrusions 10 may be joined end-to-end to provide a continuous elongated bus run comprised of a multiconductor bus assembly. As shown best in FIG. 12a, conductive extrusions 10a through 10d have their integrally formed ribs 12a through 12d mechanically fastened to an associated one of the radially aligned mounting ribs 15 of the star-type extrusion 13 which is also shown in FIGS. 3a, 3b, and 9. FIG. 12b best shows the manner in which conductor portion 10b, comprised of sections 10b and 10b', and conductor portion 10c, comprised of sections 10c and 10c', may be electrically coupled to one another. An internal guide 50, which may, for example, be a pipe or other tubular conductive member, is inserted into the adjacent ends of conductive portions 11a and 11a'. The conductor pipe 50 may be welded to one of the conductor sections, for example, in the locations 51 and 52, or may be bolted thereto by suitable fastening means which may, for example, be inserted at 53. Flexible conductor straps 54 and 55 are provided to establish a good current path between sections 11a and 11a'. Preferably, the right-hand end of conductor pipe 50 (although preferably press-fitted within conductor section 11a') is not welded or otherwise bolted to section 11a' to allow for expansion and contraction. The flexible straps 54 and 55 are provided with sufficient "play" to similarly allow for expansion and contraction without affecting the current carrying capabilities of the structure. These straps may either be welded to ribs 12b and 12b' or may be bolted thereto (at locations 56, for example). Conductor 10c comprised of sections 10c and 10c' may likewise be coupled with expansion connecting assemblies which are designated by similar numerals. A detailed description has been omitted herein for purposes of brevity.

FIGS. 13a and 13b show still another preferred embodiment for the conductor extrusion of FIGS. 1a and 1b. This embodiment 60 is comprised of a semicircular-shaped current carrying conductor portion 61 having enlarged portions 62a and 62b at the free ends thereof. An integrally formed mounting rib 63 is joined to the current carrying portion 61 at a point 64 intermediate the free ends thereof. This structure can be coupled to star-type extrusions of the type already described in connection with FIGS. 2a through 6b. This conductor extrusion can be used with equal effectiveness, but appears to be preferred for use in multiconductor assemblies which utilize four or more subconductors.

FIGS. 14a through 14c show one typical assembly employing the conductor extrusions 60 and further show the manner in which two such multiconductor assemblies, employing extrusions 60 and arranged at right angles to one another, may be joined to one another to form a tap therebetween. As shown in FIGS. 14a through 14c one such assembly 70 which is tapped to another assembly 70' of similar design, is comprised of a star-type extrusion 13 (note also FIGS. 3a and 3b) whose radially projecting mounting ribs 15 are mechanically fastened to the integrally formed conductor ribs 63a through 63d of conductor extrusions 60a through 60d, respectively. The actual mounting means have been omitted for purposes of simplicity, but their locations are shown at 65a through 65d, respectively. The second bus assembly 70' is shown best in FIG. 14c which is a sectional view of FIG. 14a looking in the direction of arrows 14c–14c. Similar elements as between FIGS. 14a and 14c and embodiments 70 and 70' have been designated with like numerals which have been primed. Since this structure is substantially identical to assembly 70, a detailed description will be omitted for purposes of simplicity. As can best be seen from FIGS. 14a and 14b, multiconductor bus assembly 70 may be assumed to be horizontally aligned, while multiconductor bus assembly 70' may be considered to be vertically aligned. A tap therebetween is facilitated by means of the hollow cylindrical shaped conductive member 71 which is welded to one surface of rectangular-shaped core 15, as shown by the weldment 72. The opposite end of conductive tube 71 is inserted within an opening 74 provided within a flat disc 73 which, in turn, has its inner periphery welded to the marginal edges of the core portion 14' of star-type extrusion 13'. A continuous weldment 75 is provided around the opening 74 in disc 73 to rigidly join and electrically connect disc 73 to conductive tube 71. The outer periphery of disc 73 is welded at 76 to a toroidal-shaped conductive member 77 which functions as a corona shield in the same manner as was described with regard to the corona shield 47, shown in FIGS. 11a and 11b. It can be seen from the embodiment of FIGS. 14a through 14c that either intersecting or end sections of multiconductor bus may be simply and readily joined to one another. It should be noted, for example, that there is no requirement that the multiconductor bus sections being joined to one another be arranged at right angles and, in fact, the inherent characteristic of the assembly enables connection between multiconductor bus to be made regardless of the angle of orientation between the buses to be joined. For example, the two bus runs may be substantially parallel to one another or normal to one another, or may assume any other angle therebetween so long as the connectors are arranged so as to maintain the star extrusions 13 and 13' in alignment, as shown best in FIGS. 14a through 14c, to facilitate joining of the conductive tube 71 therebetween.

It can be seen from the foregoing description that the present invention provides a novel conductor and spacing assembly which is easy to use, simple in design, and provides extremely rigid support for associated electrical equipment to be connected thereto, and which has a physical configuration which provides high corona inception levels and extremely large heat dissipating surface areas to enable extremely high current carrying capability in relationship to the relatively light-weight members employed.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which an exclusive privilege or property is claimed are defined as follows:

1. A bare conductor specially adapted for use in multiconductor structures employed for collectively conducting current in a single bus run operating at extra high current and voltage EHV ratings, said conductor comprising:
    an elongated conductive portion having an arcuate shape, the edges of said arcuate shaped conductive portion having smooth rounded beads to reduce the formation of corona;
    an elongated mounting flange integrally formed with said conductive portion and extending outwardly from and being substantially aligned with the longitudinal axis of said conductive portion strap means arranged at spaced intervals along said conductor and joined to said flange for mechanically joining said conductor to other conductors and thereby maintaining a predetermined spacing therebetween.

2. The conductor of claim 1 wherein said conductive portion has a semicircular cross-section thereby defining opposing concave and convex surfaces;
    said mounting flange extending outwardly from the center of the concave surface of said conductive portion.

3. Means for joining multiconductor bus sections arranged in end-to-end fashion wherein each bus section is comprised of a plurality of conductors, each of said conductors being comprised of an elongated hollow tubular shaped conductor portion and an elongated mounting flange integrally formed with said conductor portion and extending outwardly from and being substantially aligned with one diameter of said conductor portion; said joining means being comprised of a tubular conductive member having each end thereof inserted into the openings of conductor portions of a pair of adjacent conductors;
    means rigidly securing one end of said tubular conductive member to one of said conductor portions while the opposite end is free to make sliding engagement with its associated conductor portion;
    at least one flexible conductive strap bridging the mounting flanges of said conductor portions and having its ends electrically connected to said flanges, said flexible conductive strap being adapted to permit relative longitudinal movement between the mounted flanges which it bridges to allow for expansion and contraction of said bus while maintaining the integrity of the conductive path along the end-to-end aligned conductor sections forming the bus run.

4. A multiconductor bus for conducting current in a single bus run, each of said conductors being comprised of
    an elongated conductive portion having an arcuate shape; and
    an elongated mounting flange integrally formed with said conductive portion and extending outwardly from and being substantially aligned with the longitudinal axis of said conductive portion;
    said conductors being arranged in a radial pattern with said mounting flanges all extending toward an imaginary central axis and being arranged at regular angular intervals about said axis;
    means rigidly supporting said conductors in said radial arrangement, said supporting means being arranged at spaced intervals along said bus run and being comprised of a hollow metallic core portion and a plurality of integrally formed supporting ribs extending radially outward from said core portion and being aligned with a mounting flange of an associated conductor;
    fastening means securing each mounting flange to its associated supporting rib.

5. The multiconductor bus of claim 4 wherein said conductive portion has a semicircular cross-section defining opposing concave and convex surfaces;
    said mounting flange extending outwardly from the center of the concave surface of said conductive portion.

6. The multiconductor bus of claim 4 wherein said conductive portion has a hollow cylindrical configuration;
    said mounting flange being substantially coplanar with one diameter of said conductive portion and extending outwardly from the outer surface of said conductive portion.

7. The bus of claim 4 further comprising a corona shield secured thereto, said corona shield being comprised of a toroidal-shaped hollow conductive member encircling said bus at a predetermined location;
    a pair of conductive straps lying along one diameter of said corona shield and having their outer ends secured to said shield;
    a second pair of conductive straps each bridging and being joined to associated pairs of supporting ribs on opposite sides of said central axis;
    means joining associated ones of said first and second pairs of straps for supporting said shield.

8. The bus structure of claim 4 further comprising at least one insulating support means including an insulator bushing;
    bracket means fastened to one end of said bushing;
    said bracket means having a pair of arms whose free ends are each aligned to engaged associated ones of said supporting ribs;
    fastening means joining the ends of said bracket means to said associated supporting ribs.

9. A bus structure comprised of first and second bus runs arranged in spaced non-parallel fashion, each of said bus runs having a multiconductor bus assembly of the type described in claim 4;
    tap means electrically connecting said first and second bus runs at the location where their paths intersect comprising
    a tubular conductive member having its opposite ends electrically connected to one supporting means of each of said first and second bus runs whereby current flowing between said first and second bus runs is conducted from the multiconductor bus of each run through the said one supporting means of said first and second bus means and the tubular member connected thereto.

10. A bus structure comprised of at least first and second bus runs arranged in end-to-end fashion, each of said bus runs being a multiconductor bus assembly of the type described in claim 4;
    short rigid conductive means mechanically joining associated conductors of said first and second bus runs;
    flexible conductive straps secured to associated conductors of said first and second bus runs and providing electrical path between the joined conductors of said first and second bus runs.

* * * * *